(12) United States Patent
Franklin (10) Patent No.: US 8,275,263 B1
(45) Date of Patent: Sep. 25, 2012

(54) MULTIPLICATION OF PHASE DEVIATIONS

(75) Inventor: James D. Franklin, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 565 days.

(21) Appl. No.: 12/492,847

(22) Filed: Jun. 26, 2009

(51) Int. Cl.
H04B 10/00 (2006.01)

(52) U.S. Cl. ............................ 398/92; 398/188; 398/182

(58) Field of Classification Search .......... 398/182–201, 398/92
See application file for complete search history.

(56) References Cited

U.S. PATENT DOCUMENTS

| | | | | |
|---|---|---|---|---|
| 5,339,185 | A * | 8/1994 | Kaede | 398/180 |
| 5,386,314 | A * | 1/1995 | Jopson | 359/326 |
| 5,400,164 | A * | 3/1995 | Kurtzke et al. | 398/150 |
| 5,457,559 | A * | 10/1995 | Saito et al. | 398/98 |
| 5,550,671 | A * | 8/1996 | Simpson et al. | 359/337 |
| 5,596,667 | A * | 1/1997 | Watanabe | 385/122 |
| 5,619,368 | A * | 4/1997 | Swanson | 359/326 |
| 5,694,239 | A * | 12/1997 | Shigematsu et al. | 359/332 |
| 5,706,113 | A * | 1/1998 | Kawanishi et al. | 398/212 |
| 5,777,766 | A * | 7/1998 | Fontana et al. | 398/154 |
| 5,798,853 | A * | 8/1998 | Watanabe | 398/150 |
| 5,825,519 | A * | 10/1998 | Prucnal | 398/98 |
| 5,999,548 | A * | 12/1999 | Mori et al. | 372/22 |
| 6,023,360 | A * | 2/2000 | Morioka et al. | 398/1 |
| 6,122,419 | A * | 9/2000 | Kurokawa et al. | 385/31 |
| 6,128,422 | A * | 10/2000 | Hodgson | 385/11 |
| 6,201,621 | B1 * | 3/2001 | Desurvire et al. | 398/154 |
| 6,256,432 | B1 * | 7/2001 | Jeon et al. | 385/24 |
| 6,327,061 | B1 * | 12/2001 | Desurvire | 398/9 |
| 6,424,774 | B1 * | 7/2002 | Takeda et al. | 385/122 |
| 6,453,082 | B1 * | 9/2002 | Watanabe | 385/15 |
| 6,456,422 | B1 | 9/2002 | Hayes et al. | |
| 6,501,579 | B2 * | 12/2002 | Li et al. | 398/212 |
| 6,522,818 | B1 * | 2/2003 | Aso et al. | 385/122 |
| 6,785,303 | B1 * | 8/2004 | Holzwarth et al. | 372/16 |
| 6,798,796 | B2 * | 9/2004 | Hiroshi et al. | 372/20 |
| 6,892,015 | B2 * | 5/2005 | Tadakuma et al. | 385/122 |
| 6,901,174 | B2 | 5/2005 | Gupta | |
| 7,068,943 | B2 * | 6/2006 | Korolev et al. | 398/148 |
| 7,136,596 | B2 * | 11/2006 | Watanabe et al. | 398/199 |
| 7,155,095 | B2 * | 12/2006 | Aso et al. | 385/123 |
| 7,164,526 | B2 * | 1/2007 | McKinstrie et al. | 359/330 |
| 7,324,267 | B2 * | 1/2008 | Melloni et al. | 359/330 |
| 7,330,301 | B2 * | 2/2008 | Harter | 359/333 |
| 7,369,779 | B1 * | 5/2008 | Croussore et al. | 398/176 |
| 7,388,710 | B2 | 6/2008 | Ono et al. | |
| 7,423,564 | B2 * | 9/2008 | Kitayama et al. | 341/137 |
| 7,436,586 | B2 | 10/2008 | Otsubo et al. | |
| 7,450,298 | B2 * | 11/2008 | Watanabe | 359/333 |
| 7,483,203 | B2 * | 1/2009 | McKinstrie | 359/333 |
| 7,483,608 | B2 * | 1/2009 | Inoue et al. | 385/122 |

(Continued)

*Primary Examiner* — Agustin Bello
(74) *Attorney, Agent, or Firm* — Hope Bauldauff Hartman, LLC (57) ABSTRACT

Technologies are described herein for a phase deviation multiplication apparatus that implements an in-place multiplication approach for multiplying the phase deviation of an input signal while maintaining the frequency of the carrier signal within a frequency band of operation. According to an embodiment, a multi-stage phase deviation multiplication apparatus includes a plurality of sequentially arranged phase deviation multipliers, including at least a first phase deviation multiplier and a last phase deviation multiplier. The phase deviation multipliers have respective predetermined phase deviation multiplication factors. The first phase deviation multiplier receives an input signal and the last phase deviation multiplier generates a last phase deviated signal. The last phase deviated signal has a phase deviation multiplication factor that is the product of the respective predetermined phase deviation multiplication factors of the plurality of phase deviation multipliers.

20 Claims, 4 Drawing Sheets

U.S. PATENT DOCUMENTS

| | | | |
|---|---|---|---|
| 7,725,037 B2 * | 5/2010 | VanDevender et al. | 398/151 |
| 7,764,423 B2 * | 7/2010 | McKinstrie et al. | 359/330 |
| 7,769,262 B2 * | 8/2010 | Oguri et al. | 385/122 |
| 7,809,222 B2 * | 10/2010 | Hartl et al. | 385/122 |
| 7,869,713 B2 * | 1/2011 | Porzi et al. | 398/98 |
| 8,059,966 B2 * | 11/2011 | Igarashi et al. | 398/179 |
| 2006/0002715 A1 * | 1/2006 | Igarashi et al. | 398/152 |
| 2006/0092500 A1 * | 5/2006 | Melloni et al. | 359/330 |
| 2006/0285197 A1 * | 12/2006 | McKinstrie | 359/333 |
| 2007/0216994 A1 * | 9/2007 | McKinstrie | 359/341.31 |
| 2008/0131138 A1 * | 6/2008 | Futami et al. | 398/152 |
| 2009/0016669 A1 * | 1/2009 | Oguri et al. | 385/11 |
| 2009/0190207 A1 * | 7/2009 | Watanabe | 359/341.3 |
| 2009/0290882 A1 * | 11/2009 | Watanabe | 398/152 |

* cited by examiner

MULTIPLICATION OF PHASE DEVIATIONS

FIELD OF THE DISCLOSURE

The present disclosure relates generally to the field of parametric signal processing, and more particularly, to increasing the modulation sensitivity by employing the use of a single or multi-stage phase deviation multiplication system.

BACKGROUND

Large modulation sensitivity improvements to electro-optic modulators have been made in the past by designing modulators with waveguide structures and more recently, incremental improvements have been made by using polymers with higher electro-optic coefficients than standard Lithium Niobate ($LiNbO_3$) modulators. Improvements have also been made by designing resonant structures, which increase the electromagnetic field in the electro-optic material, but these modulators have limited bandwidth. Despite these improvements, there still exists a need for obtaining higher wideband frequency and phase modulation sensitivities.

It is with respect to these considerations and others that the disclosure made herein is presented.

SUMMARY

Technologies are described herein for multiplying the phase deviation of an electromagnetic signal, while maintaining the frequency of the electromagnetic signal within a frequency band of operation. According to one embodiment, a phase deviation multiplication apparatus includes phase deviation multipliers that are arranged sequentially, including a first phase deviation multiplier and a last phase deviation multiplier. The phase deviation multipliers each have associated pre-determined phase deviation multiplication factors. The first phase deviation multiplier receives an input signal and the last phase deviation multiplier generates a last phase deviated signal that has a phase deviation multiplication factor that is the product of the predetermined phase deviation multiplication factors of the phase deviation multipliers.

In another embodiment, a method for multiplying the phase deviation of an electromagnetic signal while maintaining the electromagnetic signal within a frequency band of operation includes generating frequency combs by passing an input signal through a nonlinear device. Upon generating the frequency combs, a filtered phase deviated signal is selected from the frequency combs by passing the frequency combs through a selective bandpass filter. The filtered phase deviated signal has a phase deviation relative to the input signal, and is maintained within the same frequency band of operation as the input signal.

In yet another embodiment, a phase deviation multiplier includes a pump laser that generates a pump laser signal and a combiner that receives the pump laser signal and an input signal to provide a combined signal. A nonlinear device receives the combined signal and generates frequency combs that have amplified phase deviations relative to the input signal. A selective bandpass filter is configured to receive the plurality of frequency combs and to selectively output a phase deviated signal.

It should be appreciated that the above-described subject matter may also be implemented in various other embodiments without departing from the spirit of the disclosure.

These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for amplifying the phase deviation of an electromagnetic signal, while maintaining the frequency of the electromagnetic signal within a frequency band of operation.

Generally, the various embodiments of the present disclosure describe systems and methods for obtaining high phase/frequency modulation sensitivity of electromagnetic signals. Those skilled in the art may appreciate that obtaining a high modulation sensitivity has the benefit of lowering the necessary drive voltage of modulators and allowing high frequency deviations to be attained for such applications as wideband frequency modulation of optical signals. A radio frequency (RF) electronics approach to increase modulation sensitivity is to multiply a narrow-band phase modulated (PM) signal using frequency multiplication hardware, where a low frequency is multiplied up along with the phase. However, for optical frequencies, a different approach is used because of the extremely high frequencies that would occur after multiplication of an optical signal. An in-place multiplication approach allows for the benefits of optical frequency multiplication, while maintaining the optical signal within the frequency band of operation.

In the following detailed description, references are made to the accompanying drawings that form a part hereof, and that show, by way of illustration, specific embodiments or examples. The present disclosure generally refers to various embodiments as frequency shift multipliers. However, specific embodiments described herein are referred to with more specific nomenclature. Referring now to the drawings, in which like numerals represent like elements through the several figures, aspects of the present disclosure will be described.

The in-place multiplication approach uses phase deviation multipliers as building blocks that when sequentially arranged, may be used to multiply the phase deviations of optical signals while maintaining the optical signals within the frequency band of operation. It should be appreciated that the present disclosure is not limited to optical signals, but may include all types of electromagnetic signals, including signals in the RF domain as well as optical domain. The present disclosure describes various embodiments of a phase deviation multiplier in FIGS. 1-4, and describes a multi-stage phase deviation multiplication system in FIG. 5 that employs some of the various embodiments described in FIGS. 1-4.

Figure 1A:
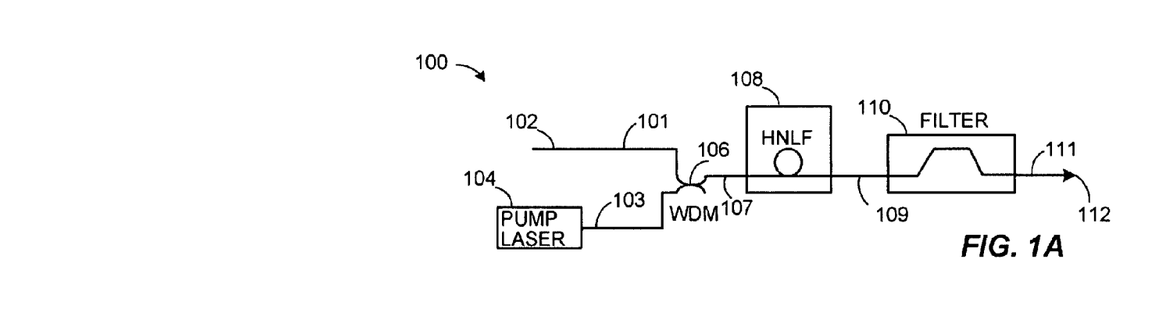
FIG. 1A is a diagram illustrating architectures including a single pass frequency shift multiplier, according to embodiments described herein.

FIG. 1A illustrates a single pass frequency shift multiplier 100 configured to receive an input signal 101 at input 102 and generate a filtered phase deviated signal 111 at output 112. The input signal 101 may be an electromagnetic signal, such as an optical signal having information modulated on it. The filtered phase deviated signal 111 may represent an electromagnetic signal that is within the same frequency band of operation as the input signal, which has a frequency $f_s$, and also contains the information that was modulated onto the input signal. The single pass frequency shift multiplier 100 may include a pump laser 104 configured to generate a pump laser signal 103. The pump laser signal 103 may also have a frequency $f_p$ that is within the same frequency band of operation as the input signal 101. The pump laser signal 103 may be used to boost the phase deviated signal 111 to a desired signal power level, while controlling noise performance.

The single pass frequency shift multiplier 100 may further include a combiner 106 configured to receive the input signal 101 and the pump laser signal 103 and generate a combined laser signal 107, which may include both the input signal 101 and the pump laser signal 103. The combiner 106 may be a wavelength division multiplexer, coupler, or any other device that multiplexes multiple electromagnetic signals, such as the pump laser signal 103 and the input signal onto a medium. The combined laser signal 107 may be transmitted through a nonlinear device 108, such as a highly nonlinear fiber to generate frequency combs 109 that are multiplicative replicas of the pump laser signal 103 and the input signal 101. In various embodiments, the nonlinear device utilizes a nonlinear process, such as Four Wave Mixing (FWM).

Figures 1B, 2:
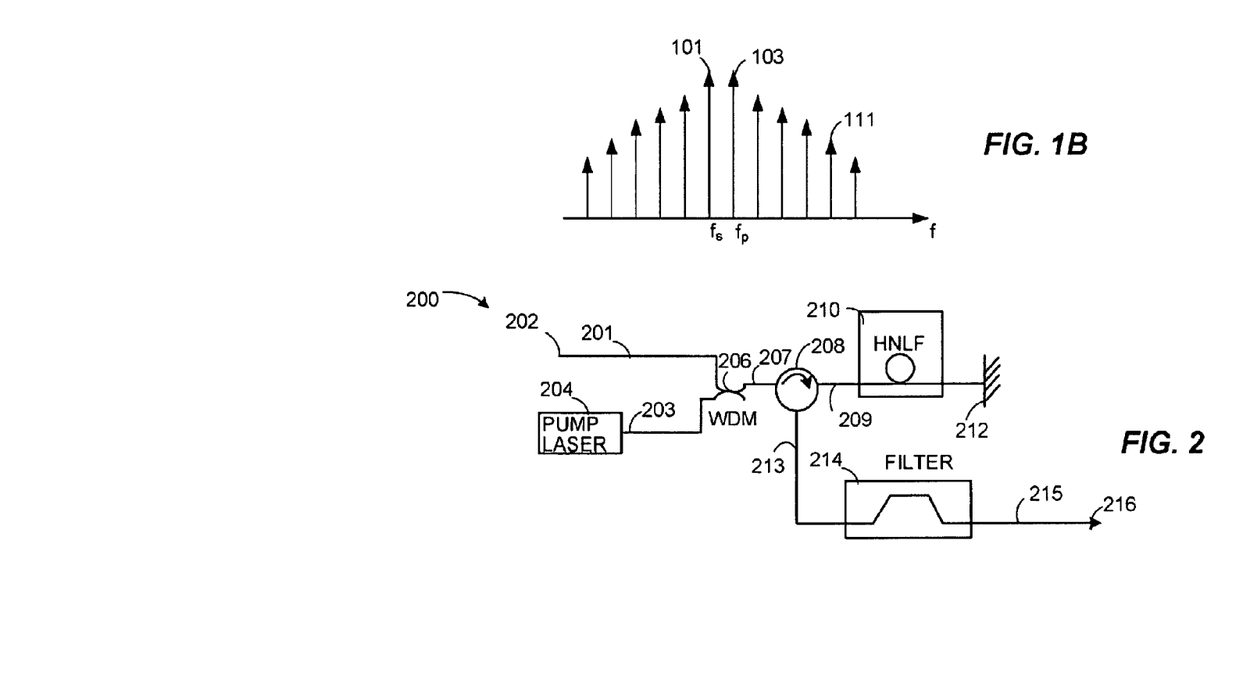
FIG. 1B is a graphical representation of frequency combs generated by a nonlinear device of the single pass frequency shift multiplier, according to embodiments described herein.
FIG. 2 is a diagram illustrating architectures including a double pass frequency shift multiplier, according to embodiments described herein.

When the combined laser signal 107 is passed through the nonlinear device 108, the pump laser signal 103 and the input signal 101 may be mixed inside the nonlinear device 108, due to the Kerr effect. More specifically, the Kerr effect may cause the pump laser signal and the input signal to mix and generate frequency combs that range in frequencies both less than and greater than the respective frequencies of the pump laser signal and the input signal, as shown in FIG. 1B. The generated frequencies of the frequency combs are given by a formula $f_{2n+1}=(n+1)f_s-nf_p$, where 2n+1 is the order of the frequency comb and n is an index. FIG. 1B illustrates a graphical representation of the frequency combs generated by the nonlinear device 108. As shown in FIG. 1B, adjacent frequency combs are separated by a frequency spacing, which is determined by the frequency difference between the pump laser signal and the input signal. As the index n increases, the phase deviation multiplication factor also increases. Although generating larger phase deviations may be desirable, the power level of respective frequency combs of a higher index tend to decrease at frequencies further away from the frequencies of the pump laser signal and the input signal. It should be appreciated that the phase modulation on the input signal is being amplified rather than the amplitude of the input signal, necessarily. Additionally, it should be appreciated that the size of the phase deviations depends on the comb order, and the amplitude of the phase deviated signal depends on the pump laser signal power and the input signal power and the properties of the nonlinear device, such as the length and the nonlinearity of the fiber.

Referring back to FIG. 1A, the frequency shift multiplier 100 may further include a selective bandpass filter 110 that is configured to receive the generated frequency combs 109 and selectively output a filtered frequency comb, in the form of the filtered phase deviated signal 111 at output 112. The selective bandpass filter 110 may operate according to predetermined parameters that define a phase deviation multiplication factor of the frequency shift multiplier 100. The phase deviation multiplication factor of any phase deviation multiplier may be the ratio of the phase deviation of the phase deviated signal over the input signal, or some other relative function correlating the filtered phase deviated signal to the input signal. The pre-determined parameters of the filter 110 may allow the filter to output a frequency comb having a specific phase deviation and frequency relative to the input signal. By selecting a filter having different predetermined parameters, any of the generated frequency combs may be filtered by the filter 110.

It should be appreciated that because the generated frequency combs have frequencies ranging from less than the frequencies of the pump laser signal 103 and the input signal 101 to frequencies greater than the frequencies of the pump laser signal 103 and the input signal 101, two frequency combs having a particular phase deviation may be generated. One of the two frequency combs may have a frequency larger than the respective frequencies of the pump laser signal 103 and the input signal 101, while the other frequency comb may have a frequency smaller than the respective frequencies of the pump laser signal 103 and the input signal 101. Hence, the selective bandpass filter 110 may select a frequency comb having a particular phase deviation and a frequency greater than or less than the respective frequencies of the pump laser signal 103 and the input signal 101.

Further, it should be appreciated that the power of the desired frequency comb may vary depending on the frequency comb selected. Typically, but not necessarily, the power of a frequency comb decreases as the phase deviation of the frequency comb relative to the input signal increases. In one embodiment, power amplifiers may be used to boost the power of the desired frequency comb, as will be discussed in further detail with regards to FIG. 5. However, it should be appreciated that the use of a power amplifier may have its own drawbacks, such as adding and amplifying noise to a signal. It should be appreciated that lower order combs will have smaller phase deviations but will have larger amplitudes.

FIG. 2 shows a double pass frequency shift multiplier 200, which includes an input 202 configured to receive an input signal 201, and a pump laser 204 configured to generate a pump laser signal 203. The double pass frequency shift multiplier 200 may further include a combiner 206 configured to receive the input signal 201 and the pump laser signal 203 and generate a combined laser signal 207 that includes both the input signal 201 and the pump laser signal 203. It should be appreciated that the pump laser 204 and the combiner 206 may be the same as or similar to the pump laser 104 and the combiner 106 described in FIG. 1. The combiner 206 supplies the combined laser signal 207 to a circulator 208 that is configured to supply the combined laser signal 207 to a nonlinear device 210, that may also be the same as or similar to the nonlinear device 108 described in FIG. 1. The nonlinear device 210 receives the combined laser signal 207 thru the circulator 208 producing frequency combs, which are reflected by reflector 212, such that the frequency combs 209 pass back through the nonlinear device 210 back to the circulator 208. It may be appreciated that the use of the reflector 212 may allow the nonlinear device 210 to have less nonlinearity than the nonlinear device 108 of single pass frequency shift multiplier 100.

The circulator 208 passes the generated frequency combs 213 from the nonlinear device 210 through a selective bandpass filter 214. The filter 214 receives frequency combs 213, and selectively outputs a filtered frequency comb, in the form of a phase deviated signal 215 at output 216, with a phase deviation multiplication factor of the double-pass frequency shift multiplier 200. As described above, the frequency of the filtered signal 215 may be greater than or less than the frequencies of the pump laser signal 203 and the input signal 201.

Figure 3:
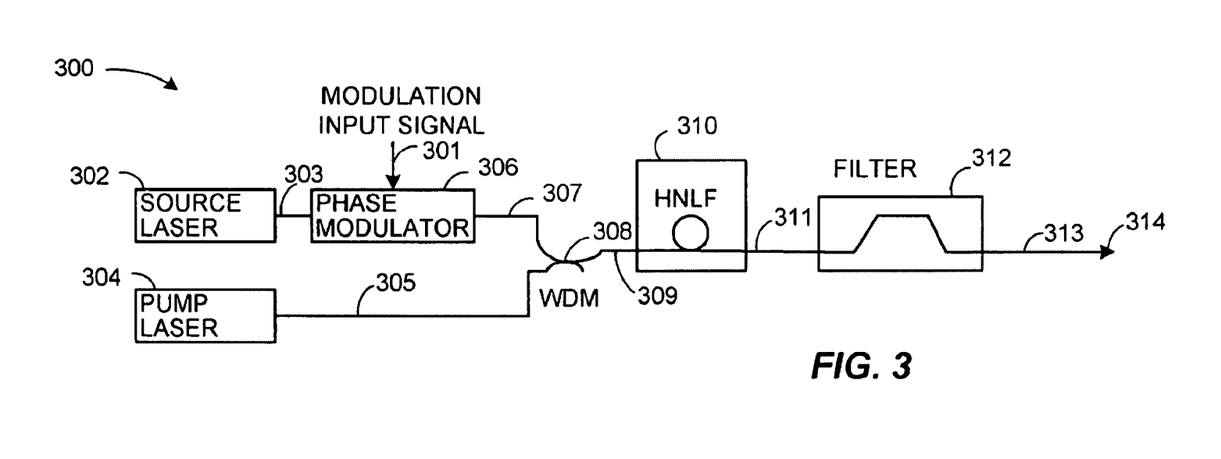
FIG. 3 is a diagram illustrating architectures including an optical deviation multiplier, according to embodiments described herein.

FIG. 3 shows an optical deviation multiplier 300, which is another embodiment of a frequency shift multiplier. The optical deviation multiplier 300 may have a similar structure to the single pass frequency shift multiplier 100, but may further include a source laser 302 that may generate a source laser carrier signal 303. The source laser carrier signal 303 may carry a modulation input signal 301, which may contain information that is to be transmitted. The modulation input signal 301 is modulated onto the source laser carrier signal 303 using a phase modulator 306. It should be appreciated that the phase modulator 306 modulates the modulation input signal 301 onto the source laser carrier signal 303 to generate a modulated source laser carrier signal 307, and the degree of modulation may vary depending on the amount of voltage supplied to the phase modulator. In the past, a larger voltage may have been supplied to increase the phase/frequency modulation. By implementing the multi-stage phase deviation multiplication system described below, larger phase/frequency modulations may be obtained than the single stage optical deviation multiplier 300, thereby reducing the drive voltage farther to the phase modulator.

The optical deviation multiplier 300 may include a pump laser 304 configured to generate a pump laser signal 305, which along with the modulated source laser carrier signal 307 may be supplied to a combiner 308, which receives the pump laser signal 305 and the modulated source laser carrier signal 307 and generates a combined laser signal 309, which may be supplied to a nonlinear device 310. Similar to the nonlinear device described in FIG. 1, the nonlinear device 310 may also generate frequency combs 311 using the Kerr effect for example. However, because the source laser carrier signal 303 is modulated prior to entering the nonlinear device 310, the frequency combs 311 will have phase deviations, similar to the phase deviations with the single pass frequency shift multiplier 100.

The optical deviation multiplier 300 may also include a selective bandpass filter 312, which is configured to receive the generated frequency combs 311 and selectively output a filtered frequency comb, in the form of a filtered phase deviated signal 313 at output 314, depending upon the phase deviation multiplication factor of the optical deviation multiplier 300. It should be appreciated that the pump laser 304, combiner 308, nonlinear device 310 and the bandpass filter 312 in the optical deviation multiplier 300 may be the same or similar to the pump laser 104, combiner 106, nonlinear device 108 and the bandpass filter 110 of the single pass frequency shift multiplier 100 described in FIG. 1.

Figure 4:
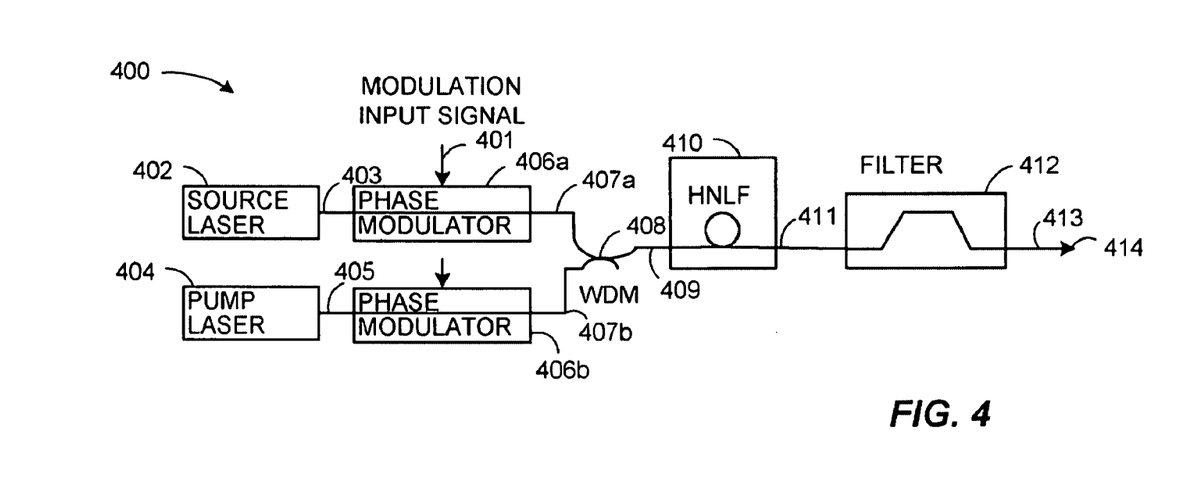
FIG. 4 is a diagram illustrating architectures including an optical deviation amplifier, according to embodiments described herein.

FIG. 4 illustrates an optical deviation amplifier 400, which is another embodiment of an optical deviation multiplier. Structurally, it may be similar to the optical deviation multiplier 300 shown in FIG. 3, but differs in that the pump laser signal generated by a pump laser is also modulated by a phase modulator.

In the optical deviation amplifier 400, a source laser 402 may generate a source laser carrier signal 403 and may supply the source laser carrier signal 403 to a phase modulator 406a, where a modulation input signal 401 containing information may be modulated onto the source laser carrier signal 403. The optical deviation amplifier 400 may further include a pump laser 404 that is configured to supply a pump laser signal 405 to a phase modulator 406b.

In some embodiments, the source laser carrier signal 403 and the pump laser signal 405 may be modulated by the same phase modulator. Further, in various embodiments, the phase modulator 406b may be an X-cut Lithium Niobate modulator capable of providing maximum multiplicative gain with the 180° phase shift between source laser signal 403 and pump laser signal 405 from modulation input signal 401. It should be appreciated that the pump laser signal and the source laser carrier signal may be modulated at 180° out of phase at the modulating frequency, such that the source laser signal and pump laser signal is modulated in a push-pull arrangement. In addition, it should be appreciated that as the phase shift between modulators varies from 0° to 180° the multiplication gain may be varied from unity to a maximum at a 180° phase shift between the modulators 406a and 406b.

Still referring to FIG. 4, the phase modulated source laser carrier signal 407a and the phase modulated pump laser signal 407b are supplied to a combiner 408, which generates a combined laser signal 409 that may include both the pump laser signal 405 and the source laser carrier signal 403. The combiner 408 may be a wavelength division multiplexer or any other device that multiplexes multiple electromagnetic signals, such as the pump laser signal 405 and the source laser carrier signal 403. The combined laser signal 409 is then passed through a nonlinear device 410, such as a highly nonlinear fiber to generate frequency combs 411 that are multiplicative replicas of the phase modulated source laser carrier signal 407a and the phase modulated pump laser signal 407b.

The nonlinear device 410 may receive the combined laser signal 409 and may generate frequency combs 411. The frequency combs 411 generated by the nonlinear device 410 in the optical deviation amplifier 400 may have a larger phase deviation relative to the frequency combs 311 generated by the optical deviation multiplier 300. The generated frequency combs 411 may then be supplied to a selective bandpass filter 412, which receives the generated frequency combs and selectively outputs a filtered frequency comb, in the form of a phase deviated signal 413 at output 414, depending upon the phase deviation multiplication factor of the optical deviation amplifier 400. In various embodiments, the filter 412 may operate similar to the filter 110, described above in FIG. 1.

As described above with respect to FIGS. 1-4, phase deviation multipliers may output a filtered phase deviated signal having a phase deviation that is a multiple of the phase deviation of the phase modulated source laser carrier signal and a frequency that is either greater than or less than the frequency of the source laser carrier signal. It should be appreciated that the filtered phase deviated signal that is output by the phase deviation multiplier may be further multiplied by supplying it as an input to a second phase deviation multiplier, whereby the second phase deviation multiplier outputs a second filtered phase deviated signal, which has a phase that is a multiple of the input phase deviated signal. In addition, the filtered phase deviated signal may be power amplified when noise is not a driving consideration. Because the filter is capable of selecting a frequency comb that has a frequency that is greater than or less than the input signal, the frequency comb may be shifted back, such that the second filtered frequency comb remains within the frequency band of operation.

Figure 5:
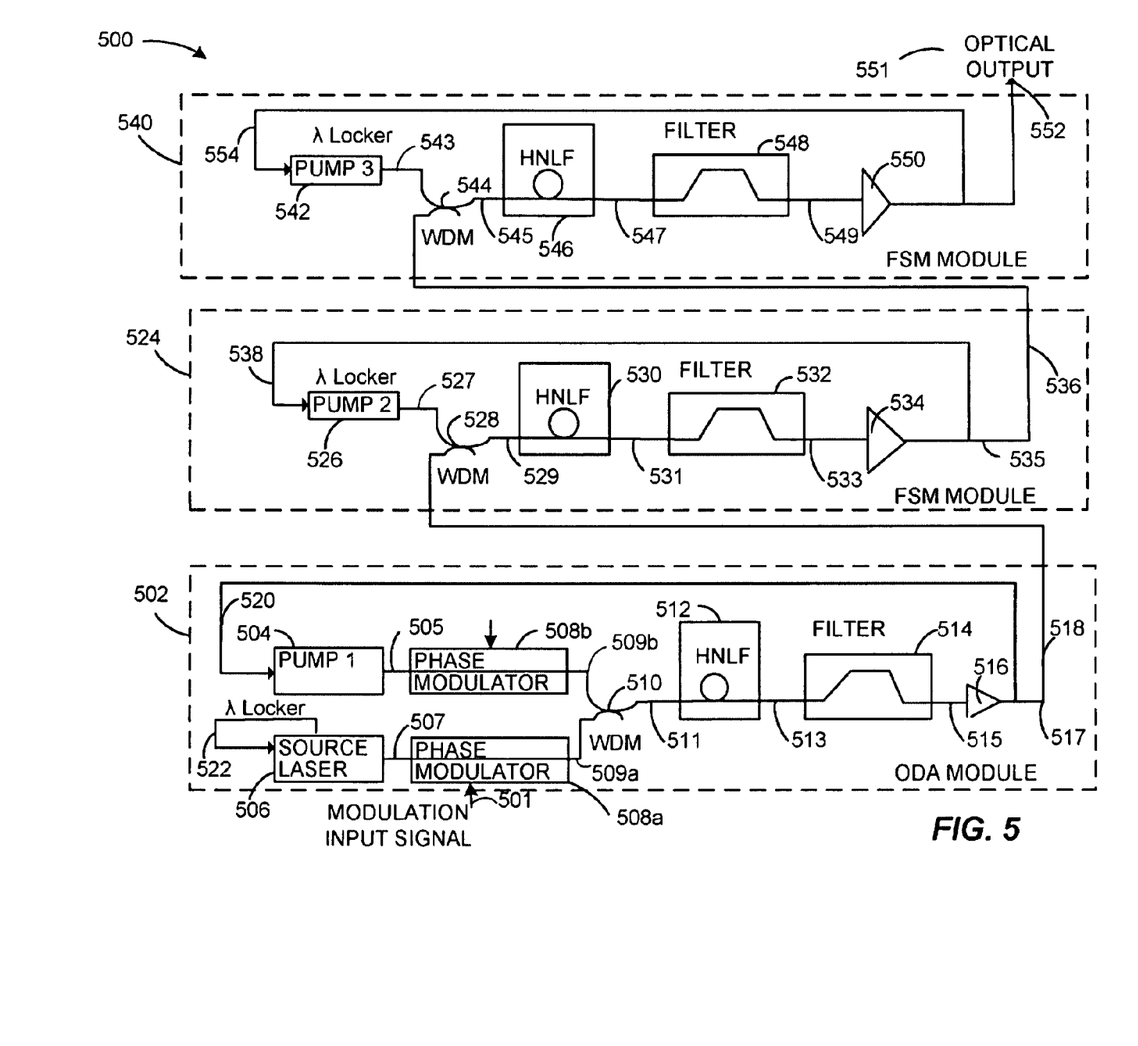
FIG. 5 is a diagram illustrating architectures including a multi-stage phase deviation multiplication system for multiplying the phase deviation of an optical signal, while maintaining the frequency of the optical signal within the frequency band of operation, according to embodiments described herein.

FIG. 5 illustrates an architecture for a multi-stage phase deviation multiplication system 500 that is configured to receive a modulation input signal 501 containing information and output an output signal 551, which may be a last filtered phase deviated signal. The multi-phase deviation multiplication system 500 may include a first phase deviation multiplier 502, which may be an optical deviation amplifier such as the one described above with regard to FIG. 4. Further, the multi-stage phase deviation multiplication system 500 may include a second phase deviation multiplier 524 and a last phase deviation multiplier 540, wherein both of these latter two phase deviation multipliers may be single pass frequency shift multipliers, such as the one described above in FIG. 1A.

The three phase deviation multipliers 502, 524 and 540 may be sequentially arranged, such that an output 518 of the first phase deviation multiplier 502 is input into the second phase deviation multiplier 524, and an output 536 of the second phase deviation multiplier 524 is input to the third phase deviation multiplier 540. It should be appreciated that any type of phase deviation multiplier may be included in the multi-stage phase deviation multiplication system, in any order, including but not limited to the single-pass frequency shift multiplier, the double-pass frequency shift multiplier, the optical deviation multiplier and the optical deviation amplifier described above in regards to FIGS. 1A-4.

The optical deviation amplifier 502 may be configured similarly to the optical deviation amplifier 400 shown in FIG. 4. The optical deviation amplifier 502 may include a first pump laser 504 that generates a first pump laser signal 505, a source laser 506 that generates a source laser carrier signal 507, and a phase modulator 508a that is configured to modulate the modulation input signal 501 containing information onto the source laser carrier signal 507 to generate a phase modulated source laser carrier signal 509a. A separate phase modulator 508b may also modulate the first pump laser signal 505 generated by the pump laser 504 to generate a phase modulated pump laser signal 509b. The source laser 506 may include a wavelength locker 522 to stabilize the wavelength of the source laser carrier signal 507, while the first pump laser 504 may include a wavelength locker 520 for stabilizing the wavelength of the first pump laser signal 505.

The optical deviation amplifier 502 may further include a combiner 510 that receives the phase modulated source laser carrier signal 509a and the phase modulated pump laser signal 509b and generates a first combined laser signal 511 that includes the phase modulated source laser carrier signal and the phase modulated first pump laser signal. The combiner 510 supplies the first combined laser signal 511 to a nonlinear device 512, which generates frequency combs 513 that have various phase deviations. The generated frequency combs 513 are then supplied to a selective bandpass filter 514, which receives the generated frequency combs 513 and selectively outputs a first filtered phase deviated signal 515, which has a particular phase deviation relative to the phase modulated source laser carrier signal 509a and phase modulated pump laser signal 509b depending upon the phase deviation multiplication factor of the optical deviation amplifier 500. The first filtered phase deviated signal 515 may then pass through a first amplifier 516 that is configured to boost the power of the first filtered phase deviated signal 515 to generate a first amplified phase deviated signal 517 at output 518. The first amplifier 516 may be an Erbium-doped fiber amplifier, which may also be placed between each stage of the multi-stage phase deviation multiplication system to amplify the filtered phase deviated comb when noise is not a driving factor.

The multi-stage phase deviation multiplication system 500 may proceed to the second stage when the first amplified phase deviated signal 517 from output 518 is supplied to the second frequency shift multiplier 524. As described above, the second frequency shift multiplier 524 may be a single-pass frequency shift multiplier and therefore, may be configured to operate similar to the frequency shift multiplier 100 described in FIG. 1. The second frequency shift multiplier 524 may include a second pump laser 526 configured to supply a second pump laser signal 527 to a second combiner 528. The second combiner 528 may receive the pump laser signal 527 and the first amplified phase deviated signal 517 from output 518 and may generate a second combined laser signal 529, which may be supplied to a second nonlinear device 530. The second nonlinear device 530 receives the second combined laser signal 529 and generates a second set of frequency combs 531. The second set of frequency combs 531 are then supplied to a second selective bandpass filter 532, which receives the second set of frequency combs 531 and selectively outputs a second filtered phase deviated signal 533, depending upon the phase deviation multiplication factor of the second frequency shift multiplier 524. The phase deviation on the second filtered phase deviated signal 533 is a product of the phase deviation on the first filtered phase deviated signal 517 and the phase deviation multiplication factor of the second phase deviation multiplier 524. The second filtered phase deviated signal 533 may then pass through a second amplifier 534 that is configured to boost the power of the second filtered phase deviated signal 533 to generate a first amplified phase deviated signal 535 at output 536. In one embodiment, the second pump laser 526 may also include a wavelength locker 538 to maintain the pump laser signal within an acceptable range of wavelengths.

It should be appreciated that in order to keep the second amplified phase deviated signal 535 within the frequency band of operation of the source laser 506, the pump laser 504, and the pump laser 526, the bandpass filter 532 may be configured to select a frequency comb having a frequency that is less than the frequency of the first amplified phase deviated signal 517. However, in various embodiments, if the first amplified phase deviated signal 517 has a frequency that is less than the first source laser carrier signal 505, then the second bandpass filter 532 may select a second filtered phase deviated signal that has a frequency larger than the first amplified phase deviated signal 517.

The multi-stage phase deviation multiplication system 500 may proceed to a third stage when the second amplified phase deviated signal 535 from output 536 is supplied to the third phase deviation multiplier 540. As described above, the third phase deviation multiplier 540 may be a single-pass frequency shift multiplier and therefore, is configured to operate similarly to the frequency shift multiplier 100 described in FIG. 1A. In the present embodiment, the third stage is the last stage of the multi-stage phase deviation multiplication system 500. However, it should be appreciated that there is no limit to the number of stages that a multi-stage phase deviation multiplication system can have, as long as the filtered phase deviated signals remain within the frequency band of operation of the source laser 506, the pump laser 504, and additional pump lasers associated with each stage of the phase deviation multiplication system.

The multi-stage phase deviation multiplication system 500 may be configured to receive the second amplified phase deviated signal 535 and to generate an output signal 551 at output 552. The third frequency shift multiplier 540 may include a third pump laser 542 configured to supply a third pump laser signal 543 to a third combiner 544. The third combiner 544 receives the third pump laser signal 543 from the pump laser 542 and the second amplified phase deviated signal 535 from output 536. The third combiner 544 may generate a third combined laser signal 545, which may include the third pump laser signal 543 and the second amplified phase deviated signal 535. The third combined laser signal 545 may then be supplied to a nonlinear device 546, where a third set of frequency combs 547 are generated. The third set of generated frequency combs 547 is then supplied to a third selective bandpass filter 548, which receives the third set of generated frequency combs and selectively outputs a third filtered phase deviated signal 549, depending upon the phase deviation multiplication factor associated with the third phase deviation multiplier 540. The third filtered phase deviated signal 549 may then pass through a third amplifier 550 that is configured to boost the power of the third filtered phase deviated signal to generate an output signal 551 at output 552. In one embodiment, the third pump laser 542 may also include a wavelength locker 554 to maintain the pump laser signal within an acceptable range of wavelengths.

The output signal 551 at the output 552 may have a phase deviation that may be equal to the product of the phase deviation multiplication factors of all the phase deviation multipliers 502, 524, and 540 in the multi-stage phase deviation multiplication system 500. However, the frequency of the last amplified phase deviated signal may nevertheless remain within the frequency band of operation of the source laser 506, the pump laser 504, the pump laser 526, and the pump laser 542.

Figure 6A:
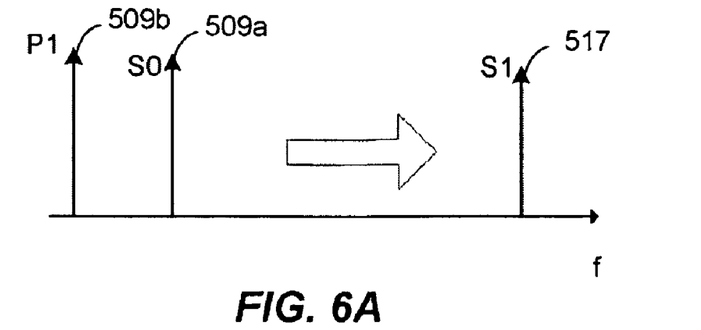
FIGS. 6A-C are graphs representing the relative frequencies of the respective input signals, pump signals, and the phase deviated signals of the various phase deviation multipliers, according to embodiments described herein.
Figure 6B:
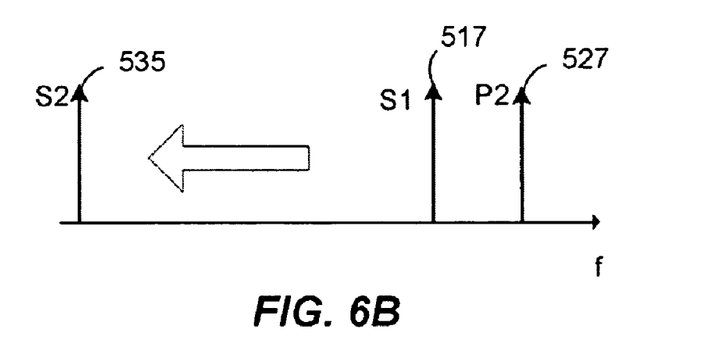
Figure 6C:
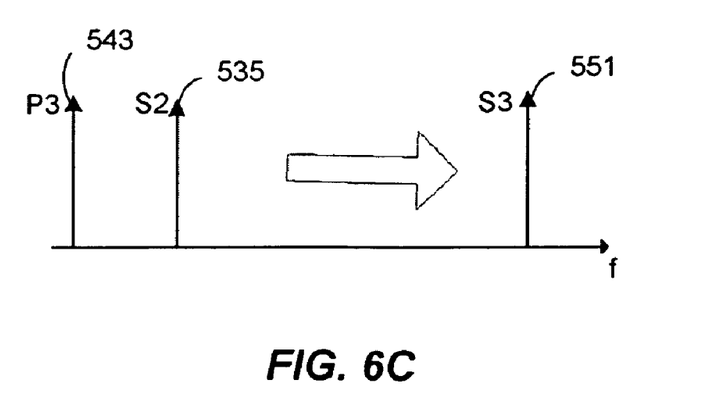

FIGS. 6A-C represent the relative frequencies of the pump laser signals, the source laser carrier signal and the amplified phase deviated signals of the respective phase deviation multipliers at various stages of the multi-stage phase deviation multiplication system 500. FIG. 6A shows the relative frequencies of signals associated with the first phase deviation multiplier 502. In the example shown in FIG. 6A, the frequency of the first amplified phase deviated signal 517 is greater than the frequency of the first source laser carrier signal 507 and is within the frequency band of operation of the source laser carrier signal 507 and the pump laser signal 505, which are all within the frequency band of operation of the system components. However, it should be appreciated that in alternate embodiments, the frequency of the first amplified phase deviated signal 517 may be less than the frequency of the first source laser carrier signal 507. In addition, it should be appreciated that the first amplified phase deviated signal 517 may exhibit a larger phase deviation relative to the phase modulated laser source carrier signal 509a and phase modulated pump laser signal 509b.

Referring to FIG. 6B, the second pump laser signal 527, the first amplified phase deviated signal 517 that is input into the second phase deviation multiplier 524, and the second amplified phase deviated signal 535 are shown. In order to maintain the second amplified phase deviated signal 535 within the frequency band of operation of the system components, the second amplified phase deviated signal 535 is selected, such that its frequency is less than the frequency of the first amplified phase deviated signal 517. By alternating the selection of frequency combs above and below the source and pump frequencies, the second amplified phase deviated signal 535 can be placed back near the original frequency of the source laser carrier signal 507.

Referring now to FIG. 6C, the third pump laser signal 543, the second amplified phase deviated signal 535 that is input into the third phase deviation multiplier, and the output signal 551 is shown. The third phase deviation selective bandpass filter 548 may select a frequency comb having a predetermined phase deviation that is a multiple of the second amplified phase deviated signal 535 and having a frequency that is larger than the frequency of the second amplified phase deviated signal 535, yet within the frequency band of operation of the system components. It may be appreciated that the phase deviation of the output signal 551 may be equal to the product of the predetermined phase deviation multiplication factors of the first phase deviation multiplier 502, the second phase deviation multiplier 524 and the third phase deviation multiplier 540.

It may be appreciated that some implementations of the multi-stage phase deviation multiplication system 500 may include any number of phase deviation multipliers, including more than the three phase deviation multipliers 502, 524, and 540 as shown in FIG. 5. The frequency shifts of each phase deviation multiplier do not necessarily need to alternate as long as the frequency separation of the source and pump laser are small enough and the frequency band of operation of the system components is large enough to support the frequencies selected. It may further be appreciated that the phase deviation multipliers may enhance efficient utilization of selected portions of the optical band by walking the filtered phase deviated signals back and forth across the frequency band of operation with each multiplication. The early multiplications can use closer frequency spaces with increased frequency separation for downstream multiples.

It should also be appreciated that the frequency errors or offsets of the source and pump lasers may be amplified along with the phase deviations, so maintaining frequency accuracy may be prioritized when operating some implementations of the multiplier. Therefore, some implementations of the multipliers may employ the wavelength lockers shown and described above to maintain the frequency accuracy.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A phase deviation multiplication apparatus, comprising:
a plurality of sequentially arranged phase deviation multipliers comprising at least a first phase deviation multiplier and a last phase deviation multiplier,
each of the plurality of phase deviation multipliers being responsive to an input signal and a pump signal to generate a respective plurality of frequency combs, each of the frequency combs having a respective phase deviation multiplication factor relative to the phase deviation of the input signal of the respective phase deviation multiplier, each of the plurality of phase deviation multipliers providing a selected phase deviated signal bypassing a selected frequency comb, the selected frequency comb providing a predetermined phase deviation multiplication factor, at least one phase deviation multiplier prior to the last phase deviation multiplier filtering out at least one of its input signal or its pump signal;

wherein the first phase deviation multiplier is configured to receive an input signal and the last phase deviation multiplier is configured to generate a last phase deviated signal, and wherein the last phase deviated signal has a phase deviation multiplication factor that is the product of the respective predetermined phase deviation multiplication factors of the plurality of phase deviation multipliers.

2. The phase deviation multiplication apparatus of claim 1 wherein:

the first phase deviation multiplier passes a first selected frequency comb which has a first frequency offset with respect to a predetermined one of its input signals; and the last phase deviation multiplier passes a last selected frequency comb which has a last frequency offset with respect to a predetermined one of its input signals;

wherein the last frequency offset is in a direction opposite to the first frequency offset.

3. The apparatus of claim 1, wherein at least one of the plurality of phase deviation multipliers comprises:

a pump laser configured to generate a pump laser signal as the pump signal;

a combiner configured to receive the pump laser signal and an optical input signal and to generate an optical combined signal;

a nonlinear device configured to receive the optical combined signal and configured to generate the respective plurality of frequency combs; and a bandpass filter configured to receive the plurality of frequency combs; and configured to selectively output the filtered phase deviated signal and to filter out at least one of the input signal or the laser pump signal.

4. The apparatus of claim 3 and further comprising a source laser to generate a source laser carrier signal modulated by the input signal, wherein the pump laser signal being 180 degrees out of phase with the input signal at the modulating frequency, such that the source laser carrier signal and pump laser signal are modulated in a push-pull arrangement.

5. The apparatus of claim 3, wherein the at least one of the plurality of phase deviation multipliers further comprises a wavelength locker.

6. The apparatus of claim 3, wherein the at least one of the plurality of phase deviation multipliers further comprises an amplifier to amplify the power of the filtered phase deviated signal.

7. The apparatus of claim 1, wherein the first phase deviation multiplier comprises a first pump laser configured to generate a first pump signal, a second phase deviation multiplier comprises a second pump laser configured to generate a second pump signal and the last phase deviation multiplier comprises a last pump laser configured to generate a last pump signal.

8. The apparatus of claim 7, wherein:

the first phase deviation multiplier is configured to output a first filtered phase deviated signal to a second phase deviation multiplier;

the second phase deviation multiplier is configured to receive the first filtered phase deviated signal and output a second filtered phase deviated signal to the last phase deviation multiplier; and the last phase deviation multiplier is configured to receive the second filtered phase deviated signal and output the last phase deviated signal.

9. The apparatus of claim 8, wherein:

the last phase deviated signal has a larger phase deviation than the second phase deviated signal;

the second phase deviated signal has a larger phase deviation than the first phase deviated signal; and the first phase deviated signal has a larger phase deviation than the input signal.

10. A method for multiplying the phase of an electromagnetic signal while maintaining the electromagnetic signal within a frequency band of operation, the method comprising:

generating a first plurality of frequency combs by providing an input signal and a pump signal to a first nonlinear device;

selecting a first filtered phase deviated signal from the first plurality of frequency combs and removing at least one of the input signal or the pump signal by filtering the first plurality of frequency combs through a first selective bandpass filter;

generating a second plurality of frequency combs by providing the first filtered phase deviated signal and a pump signal to a second nonlinear device;

selecting a second filtered phase deviated signal from the second plurality of frequency combs by filtering the second plurality of frequency combs through a second selective bandpass filter;

wherein the second filtered phase deviated signal has a greater phase deviation relative to the input signal and a greater phase deviation relative to the first filtered phase deviated signal, and is maintained within the same frequency band of operation as the input signal.

11. The method of claim 10, wherein:

the first filtered phase deviated signal has a first frequency offset with respect to a predetermined one of its input signals; and the second filtered phase deviated signal has a second frequency offset with respect to a predetermined one of its input signals;

wherein the second frequency offset is in a direction opposite to the first frequency offset.

12. The method of claim 10, further comprising amplifying the power of the first filtered phase deviated signal by passing the first filtered phase deviated signal through an amplifier prior to providing the second phase deviated signal to the second nonlinear device.

13. The method of claim 10, further comprising:

phase modulating a source laser carrier signal by the input signal, and phase modulating the pump signal by the input signal, by using phase modulator; and combining the modulated source laser carrier signal and the modulated pump signal to supply to the first nonlinear device.

14. The method of claim 13, further comprising wavelength locking the pump signal to maintain the frequency of the pump signal.

15. A phase deviation multiplier, comprising:

a pump laser configured to generate a pump laser signal;

a first combiner configured to receive the pump laser signal and an input signal and to generate a combined signal;

a first nonlinear device configured to receive the combined signal and configured to generate a plurality of frequency combs having respective amplified phase deviations relative to the input signal;

a first selective bandpass filter configured to receive the plurality of frequency combs and configured to selectively output a first selected frequency comb as a first filtered phase deviated signal and to remove at least one of the pump laser signal or the input signal;

a second nonlinear device configured to receive the first filtered phase deviated signal from the first selective bandpass filter and a pump signal and configured to generate a second plurality of frequency combs having respective amplified phase deviations relative to the first filtered phase deviated signal; and a second selective bandpass filter configured to receive the second plurality of frequency combs and configured to selectively output a second frequency comb as a second filtered phase deviated signal.

16. The phase deviation multiplier of claim 15, further comprising a phase modulator interposed between the input signal and the combiner, and configured to:

receive a source laser carrier signal from a source laser and the input signal to generate a phase modulated source laser carrier signal; and supply the phase modulated source laser carrier signal as the input signal to the combiner.

17. The phase deviation multiplier of claim 16, further comprising a pump laser phase modulator configured to receive the pump laser signal and the input signal and supply the phase modulated pump laser signal to the combiner as the pump laser signal.

18. The phase deviation multiplier of claim 17, further comprising a multiplication gain that varies from unity when the phase shift between the phase modulated pump laser signal and the phase modulated source laser carrier signal is 0 degrees to a maximum when phase shift between the phase modulated pump laser signal and the phase modulated source laser carrier signal variable is 180 degrees.

19. The phase deviation multiplier of claim 15 wherein:

the first selective bandpass filter outputs the first filtered phase deviated signal having a first frequency offset with respect to a predetermined one of its input signals; and the second selective bandpass filter outputs the second filtered phase deviated signal having a second frequency offset with respect to a predetermined one of its input signals; and wherein the second frequency offset is in a direction opposite to the first frequency offset.

20. The phase deviation multiplier of claim 15, further comprising:

a circulator being configured to pass the combined signal to the first nonlinear device; and a reflector being configured to pass the plurality of frequency combs through the first nonlinear device to the circulator;

wherein the combiner and reflector being further configured to pass the combined signal through the first nonlinear device at least twice before being received by the first selective bandpass filter.

* * * * *